United States Patent
Wittenbreder, Jr.

(10) Patent No.: US 7,649,754 B1
(45) Date of Patent: Jan. 19, 2010

(54) SELF LIMITING ZERO VOLTAGE SWITCHING POWER CONVERSION NETWORKS

(76) Inventor: Ernest Henry Wittenbreder, Jr., 3260 S. Gillenwater Dr., Flagstaff, AZ (US) 86001-8946

( * ) Notice: Subject to any disclaimer, the term of this patent is extended or adjusted under 35 U.S.C. 154(b) by 184 days.

(21) Appl. No.: 11/865,135

(22) Filed: Oct. 1, 2007

(51) Int. Cl.
*H02M 3/335* (2006.01)
(52) U.S. Cl. .................................... 363/21.03
(58) Field of Classification Search ............ 363/16, 363/20, 21.01–21.03, 21.06, 21.14; 323/265, 323/268, 271
See application file for complete search history.

(56) References Cited

U.S. PATENT DOCUMENTS

| | | | |
|---|---|---|---|
| 5,872,705 A * | 2/1999 | Loftus et al. | 363/21.06 |
| RE36,571 E * | 2/2000 | Rozman | 363/21.06 |
| 6,956,522 B2 * | 10/2005 | Gottwald | 342/70 |
| 7,035,120 B2 * | 4/2006 | Tobita | 363/21.06 |

* cited by examiner

*Primary Examiner*—Matthew V Nguyen

(57) ABSTRACT

The subject invention reveals a new three terminal canonical cell for non-isolated power conversion. The canonical cell achieves reduced semiconductor component stresses for applications with limited line voltage range for small step up and step down ratios or for large step up and step down ratios. Some of the canonical cells can be used to form buck, boost, and buck boost converters. The new canonical cell achieves zero voltage switching over a broad range of line and load voltages and is self limiting without the addition of additional components to sense and respond to over load current.

9 Claims, 13 Drawing Sheets

SELF LIMITING ZERO VOLTAGE SWITCHING POWER CONVERSION NETWORKS

BACKGROUND OF THE INVENTION

1. Field of the Invention

The subject invention generally pertains to electronic power conversion circuits, and, more specifically, to high frequency, switched mode electronic power converters. The subject matter relates to new non-isolated power conversion networks which provide high efficiency power conversion under special conditions where more conventional power conversion networks do not work as well.

2. Description of Related Art

The solution to the problem of converting power where the input to output or output to input voltage ratio is either very small or very large has traditionally relied upon tapped inductor power converters. New tapped inductor power conversion networks have been introduced that achieve reduced semiconductor and magnetic circuit element component stresses. An example of a circuit that achieves improved efficiency over the known alternatives for large input to output step down ratios is illustrated in FIG. 1. FIG. 1 is a minimum voltage tapped inductor buck converter. Compared to a simple buck converter the component stress factors for the FIG. 1 circuit are superior to the simple buck converter. $M_1$ in FIG. 1 operates at higher duty cycle and lower current than the high side switch of the simple buck converter and $M_3$ operates at lower duty cycle and higher current than the low side switch of the simple buck converter. The FIG. 1 circuit does not achieve zero voltage switching unless the coupled inductor has inherent to it a large amount of leakage inductance. The leakage inductance will create the potential for electromagnetic interference (emi) unless additional remedies are taken to avoid the emi problem. What is needed is a circuit that can accommodate large step down ratios without the requirement for a tapped inductor that also readily achieves zero voltage switching.

OBJECTS AND ADVANTAGES

An object of the subject invention is to reveal new beneficial circuit topologies for applications with limited line voltage range and either very large or very small step up or step down ratios.

Another object of the subject invention is to reveal new beneficial circuit topologies with zero voltage switching for elimination of first order drain circuit switching losses.

Another object of the subject invention is to provide a power conversion network that is self limiting without addition of limiting circuits.

Further objects and advantages of my invention will become apparent from a consideration of the drawings and ensuing description.

These and other objects of the invention are provided by novel circuit techniques that limit voltage stress of the power converter's switches and reduce component stress factors.

SUMMARY

The subject invention reveals new power converter topologies that are useful for power converters with limited line voltage range and either small or large step up or step down load to line voltage ratios. The new circuit topologies achieve zero voltage switching over a broad range of line and load and self limiting.

DESCRIPTION OF THE PREFERRED EMBODIMENTS

Figure 1:
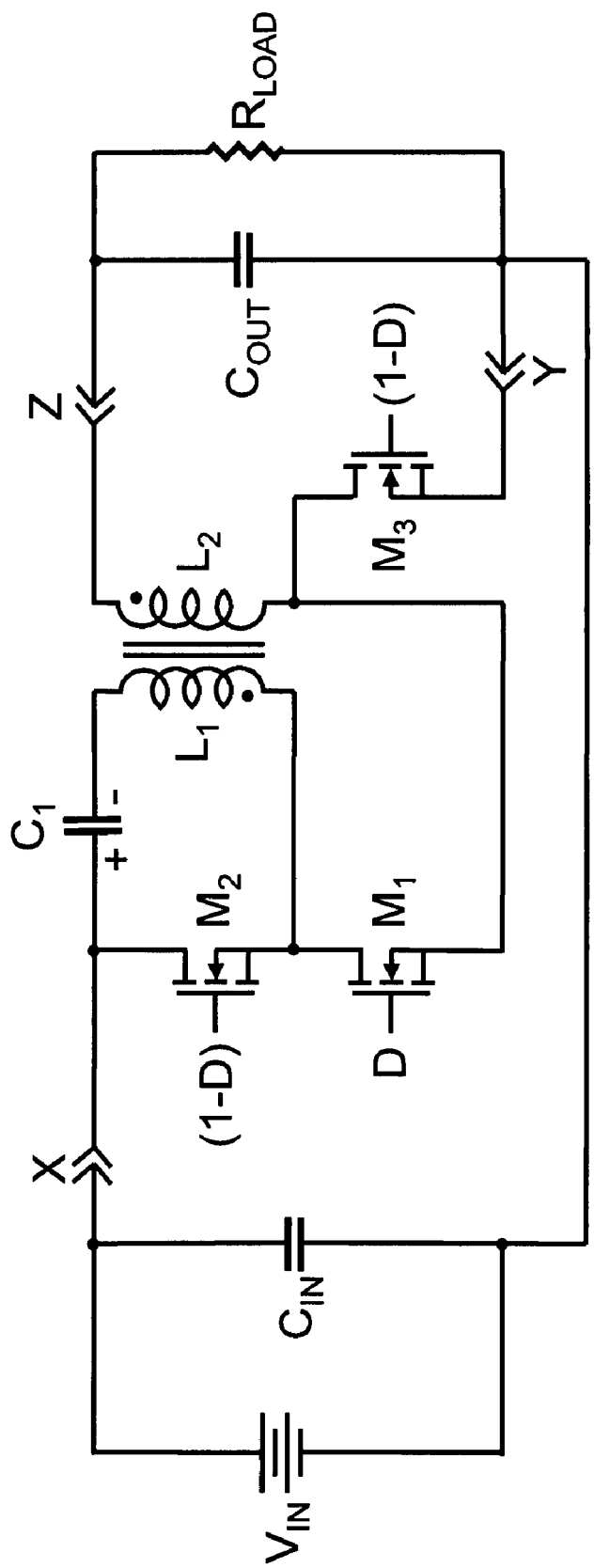
FIG. 1 illustrates a minimum voltage tapped inductor buck converter for large step down ratio according to the prior art.
Figure 2:
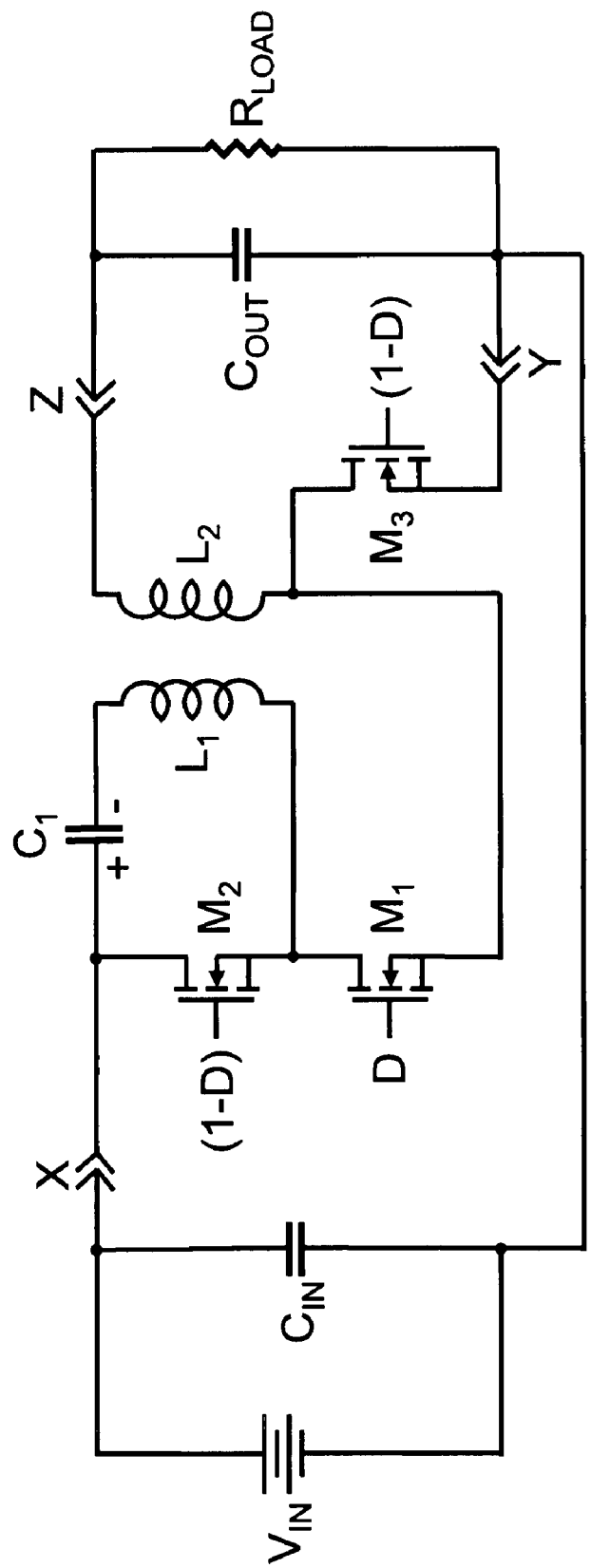
FIG. 2 illustrates a capacitor coupled buck converter according to the subject invention.

FIG. 2 illustrates a capacitor coupled buck converter according to the subject invention. In FIG. 2 a first terminal of a source of dc voltage and power, $V_{IN}$, is connected to a first terminal of a capacitor, $C_{IN}$, and a first terminal, X, of a power conversion network. A second terminal of $V_{IN}$ is connected to a second terminal of capacitor, $C_{IN}$, a second terminal, Y, of the power conversion network, a first terminal of a capacitor, $C_{OUT}$, and a first terminal of a load, $R_{LOAD}$. The terminal, X, of the power conversion network is connected to a first terminal of a capacitor, $C_1$, and a first terminal of a switch, $M_2$. A second terminal of the capacitor, $C_1$, is connected to a first terminal of an inductor, $L_1$. A second terminal of inductor, $L_1$, is connected to a second terminal of the switch $M_2$ and to the first terminal of a switch, $M_1$. A second terminal of switch $M_1$ is connected to a first terminal of an inductor $L_2$ and to a first terminal of a switch $M_3$. A second terminal of switch $M_3$ is connected to terminal Y of the power conversion network. A second terminal of inductor $L_2$ is connected to a third terminal Z of the power conversion network. The terminal Z of the power conversion network is connected to a second terminal of the capacitor $C_{OUT}$, and to a second terminal of the load, $R_{LOAD}$.

Figure 3:
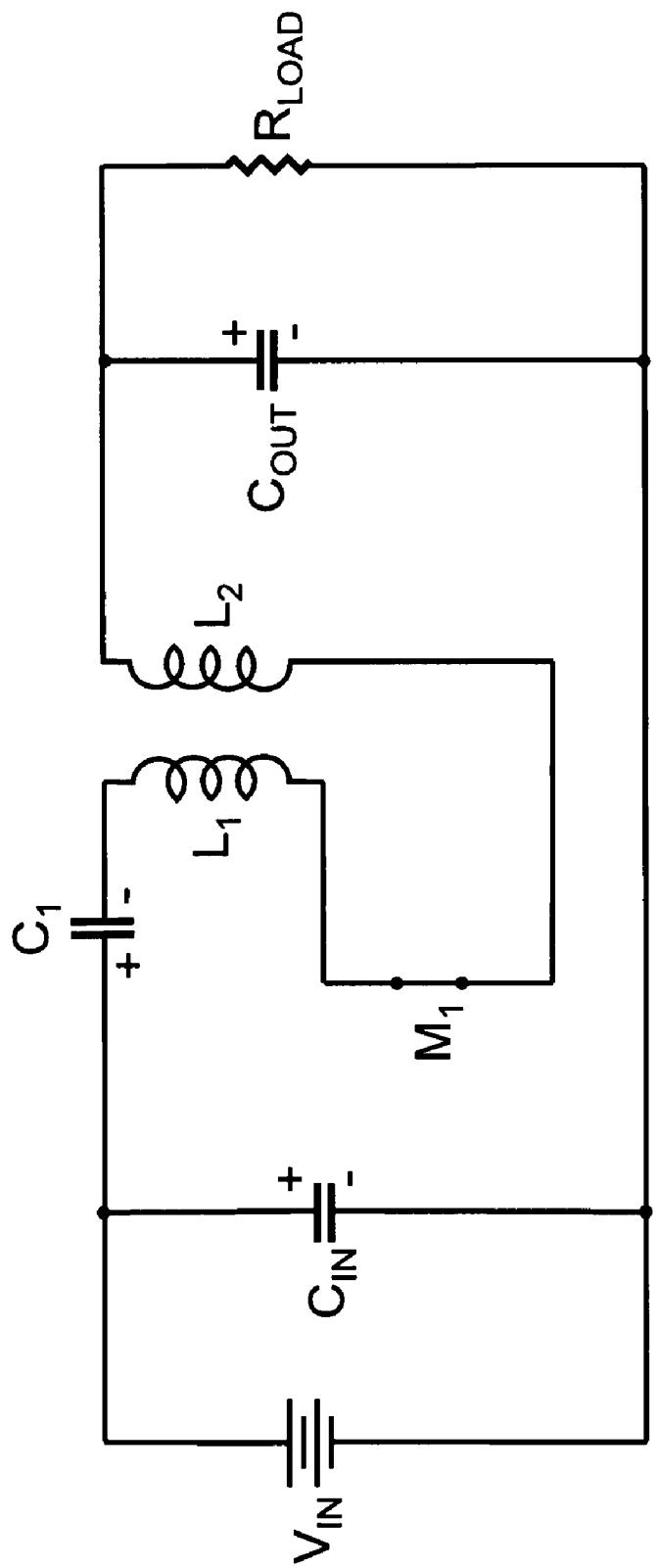
FIG. 3 illustrates a first operating state of the FIG. 2 circuit according to the subject invention.
Figure 4:
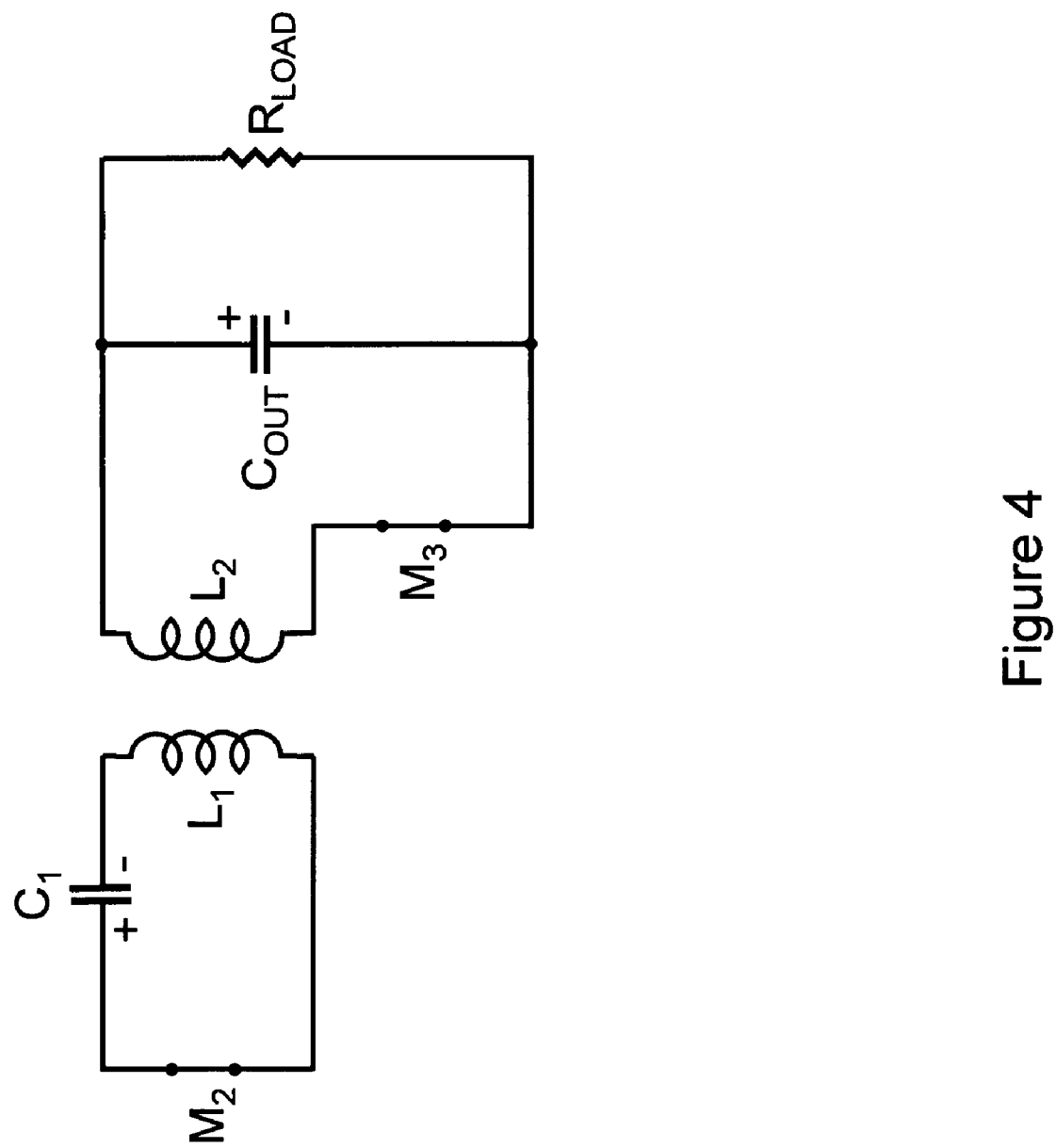
FIG. 4 illustrates a second operating state of the FIG. 2 circuit according to the subject invention.
Figure 5:
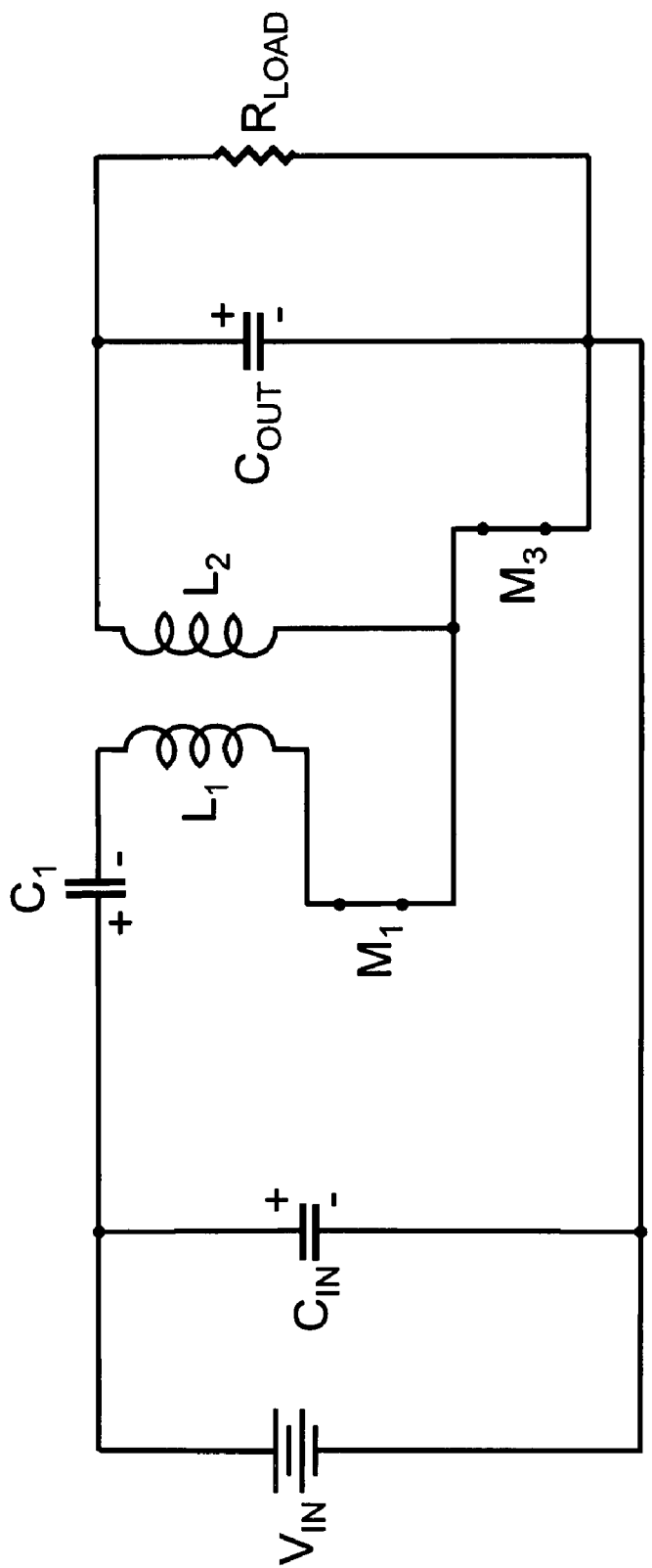
FIG. 5 illustrates a third operating state of the FIG. 2 circuit according to the subject invention.
Figure 6:
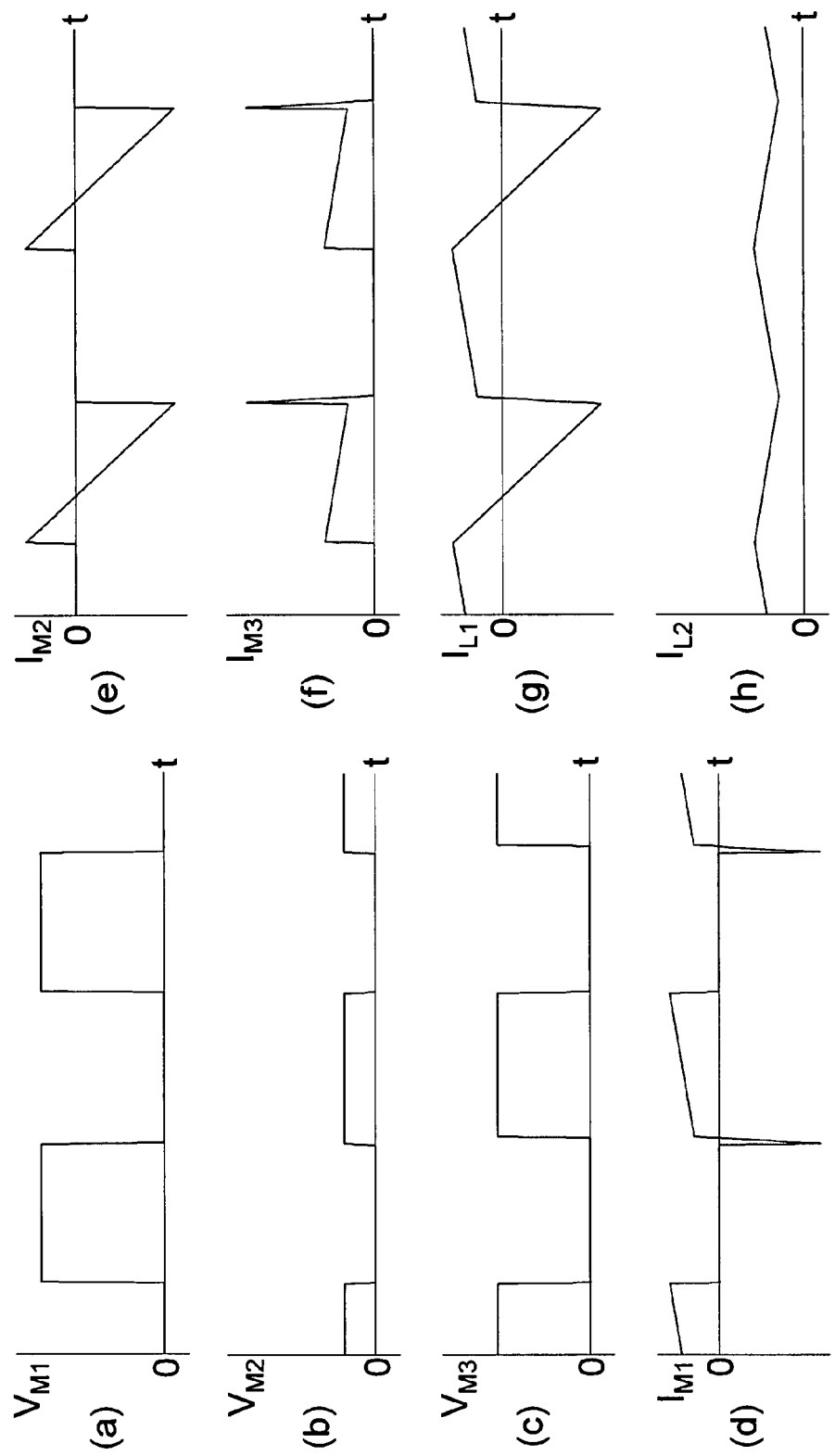
FIG. 6(a) illustrates a voltage wave form of the $M_1$ switch of the FIG. 2 circuit according to the subject invention.
FIG. 6(b) illustrates a voltage wave form of the $M_2$ switch of the FIG. 2 circuit according to the subject invention.
FIG. 6(c) illustrates a voltage wave form of the $M_3$ switch of the FIG. 2 circuit according to the subject invention.
FIG. 6(d) illustrates a current wave form of the $M_1$ switch of the FIG. 2 circuit according to the subject invention.
FIG. 6(e) illustrates a current wave form of the $M_2$ switch of the FIG. 2 circuit according to the subject invention.
FIG. 6(f) illustrates a current wave form of the $M_3$ switch of the FIG. 2 circuit according to the subject invention.
FIG. 6(g) illustrates a current wave form of the $L_1$ inductor of the FIG. 2 circuit according to the subject invention.
FIG. 6(h) illustrates a current wave form of the $L_2$ inductor of the FIG. 2 circuit according to the subject invention.

For purposes of description and analysis we will assume that the circuit has reached a steady state condition. We will assume that the operation of the switches is break before make and we will assume that the values of capacitors are sufficiently large that the capacitor voltages are invariant over a full cycle of operation. In steady state operation, except for brief transition times between states, there are three operating states of the FIG. 2 circuit. In a first operating state, illustrated in FIG. 3, the switch $M_1$ is on (conducting) and the switches $M_2$ and $M_3$ are off (not conducting). During the first operating state, current flows from $V_{IN}$ through the X terminal, through $C_1$, $L_1$, $M_1$, $L_2$ and through the Z terminal through $R_{LOAD}$ and back to $V_{IN}$. During the first operating state, stored energy builds in $C_1$ and in the two inductors. During the first operating state, energy is transferred from the source $V_{IN}$ to $C_1$, the two inductors, and the load $R_{LOAD}$. At the end of the first operating state the stored energy is a maximum in the inductor $L_2$. At the end of the first operating state $M_1$ is turned off. At the beginning of the second operating state, illustrated in FIG. 4, $M_2$ and $M_3$ are turned on at zero voltage driven by the stored energy in $L_1$ and $L_2$. During the second operating state, current flowing in $L_2$ flows through the Z terminal to $R_{LOAD}$ and through the Y terminal through $M_3$ back to $L_2$. At the beginning of the second operating state stored magnetic energy in the inductors ramps down. At the beginning of the second operating state, current and energy flow from the inductor $L_1$ to the capacitor $C_1$. During the second operating state, current in the inductor $L_1$ ramps down to zero and then builds up in the opposite direction from the current direction in $L_1$ at the beginning of the second operating state, as illustrated in FIGS. 6(e) and 6(g). Stored energy in $C_1$ reaches a peak when the current in $L_1$ reaches zero. Current and energy reach a maximum in the inductor $L_1$ at the end of the second operating state. During most of the second operating state energy is transferred from $C_1$ to the inductor $L_1$. At the end of the second operating state the switch $M_2$ is turned off and the energy stored in $L_1$ drives a zero voltage turn on transition for $M_1$. During a brief third operating state, illustrated in FIG. 5, both $M_1$ and $M_3$ are conducting and the current in $L_1$ is rapidly rising up to the current in $L_2$. When the current in $L_1$ reaches the level of the current in $L_2$, $M_3$ is turned off and the cycle repeats. In practice, the gates of $M_2$ and $M_3$ may be driven off at the same time, but for $M_3$ driving its gate off merely shifts its current into its intrinsic body diode.

The voltages and currents for each of the switches and the currents for each of the inductors are illustrated in FIGS. 6(a) through 6(h).

The FIG. 2 circuit comprises a non-isolated voltage step down converter. The relationship between the output voltage, the input voltage and the duty cycle is a complicated relationship since the $C_1$ capacitor voltage is highly dependent on the load current and the value of the inductor $L_1$. The steady state $C_1$ capacitor voltage increases with load current and increases with the inductance of $L_1$. In the steady state, during a switching cycle, the charge flowing into $C_1$ must be equal to the charge that flows out of $C_1$. During all of the first operating state and parts of both the second and third operating states $C_1$ is being charged. During the second operating state current in the loop consisting of $C_1$, $M_2$, and $L_1$ follows a linear ramp. Since $C_1$ charges during all of the first operating state it follows that $C_1$ must discharge significantly during the second operating state which implies that the negative current peak of the $L_1$ current that occurs at the end of the second operating state must be larger than the positive peak of $L_1$ current that occurs at the beginning of the second operating state. The variation of current required by the inductor $L_1$ over a switching cycle is considerably larger than the variation of current required by the inductor $L_2$, which suggests that in most cases the designer will want to make the value of $L_1$ smaller than the value of $L_2$. The fact that the peak current in $L_1$ is much higher than the peak current in $L_2$ suggests that $L_1$ can be much smaller than $L_2$ and still have sufficient energy to drive the zero voltage turn on transition for $M_1$.

For a given switching frequency and input and output voltage $C_1$ and $L_1$ form an effective upper limit to the current and power that can be processed by the FIG. 2 circuit, thereby providing a built in current limiting mechanism without the need to sense current directly. The current limit and maximum processed power can be increased by reducing the inductance of $L_1$. An increase in current will result in an increase in $C_1$ capacitor voltage which will result in a smaller current ramp in the inductors during the first and third operating state, requiring a larger duty cycle (time duration of first operating state) and a longer third operating state. A larger duty cycle implies that the time duration of the second operating state must be smaller which requires that the $C_1$ capacitor voltage must be larger in order to discharge sufficiently during the second operating state to achieve charge balance over a full switching cycle. At the point that the increase in duty cycle does not allow for sufficient time for the $C_1$ capacitor to discharge sufficiently during the second operating state to achieve charge balance the circuit will self limit, output voltage will begin to fall, and no increase in current will be achievable.

In the FIG. 2 circuit $M_3$ appears as a synchronous rectifier. If a rectifier diode is substituted for $M_3$ the operation of the circuit will be the same as described above and the FIG. 2 circuit with $M_3$ replaced by a diode should be considered an embodiment of the subject invention.

Figure 7:
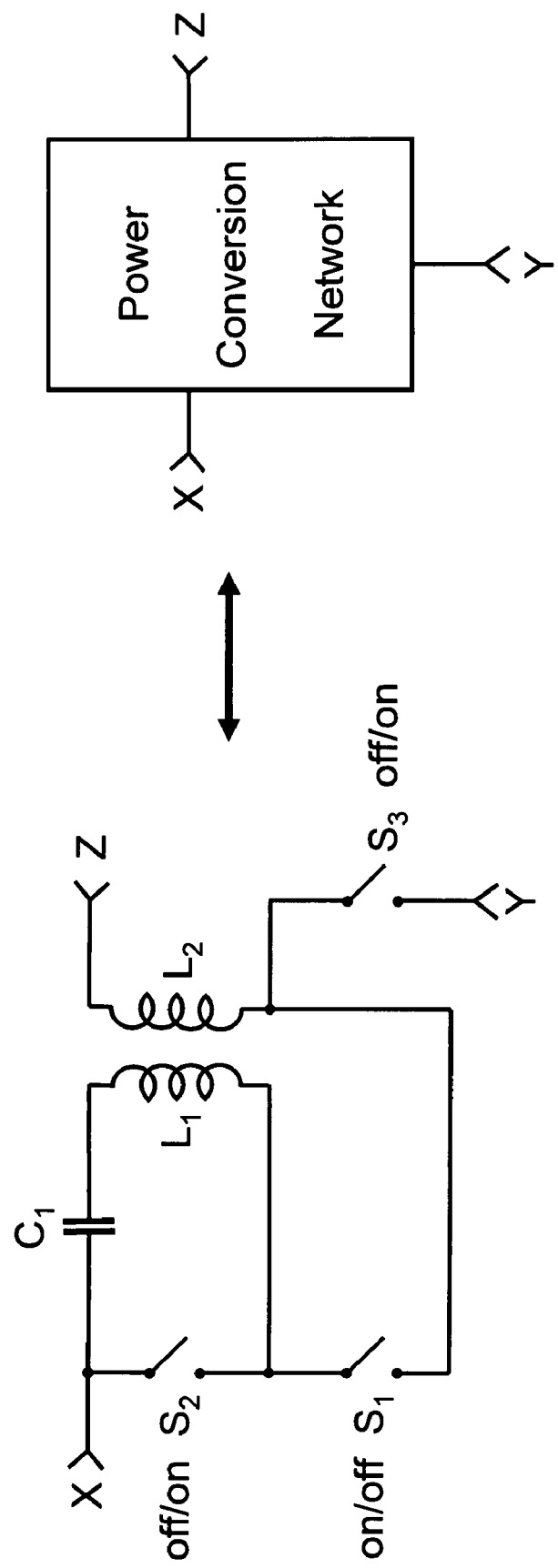
FIG. 7 illustrates a general power conversion network that can be connected as buck, boost, or buck boost converters for either small or large ratios of input to output according to the subject invention.
Figure 8:
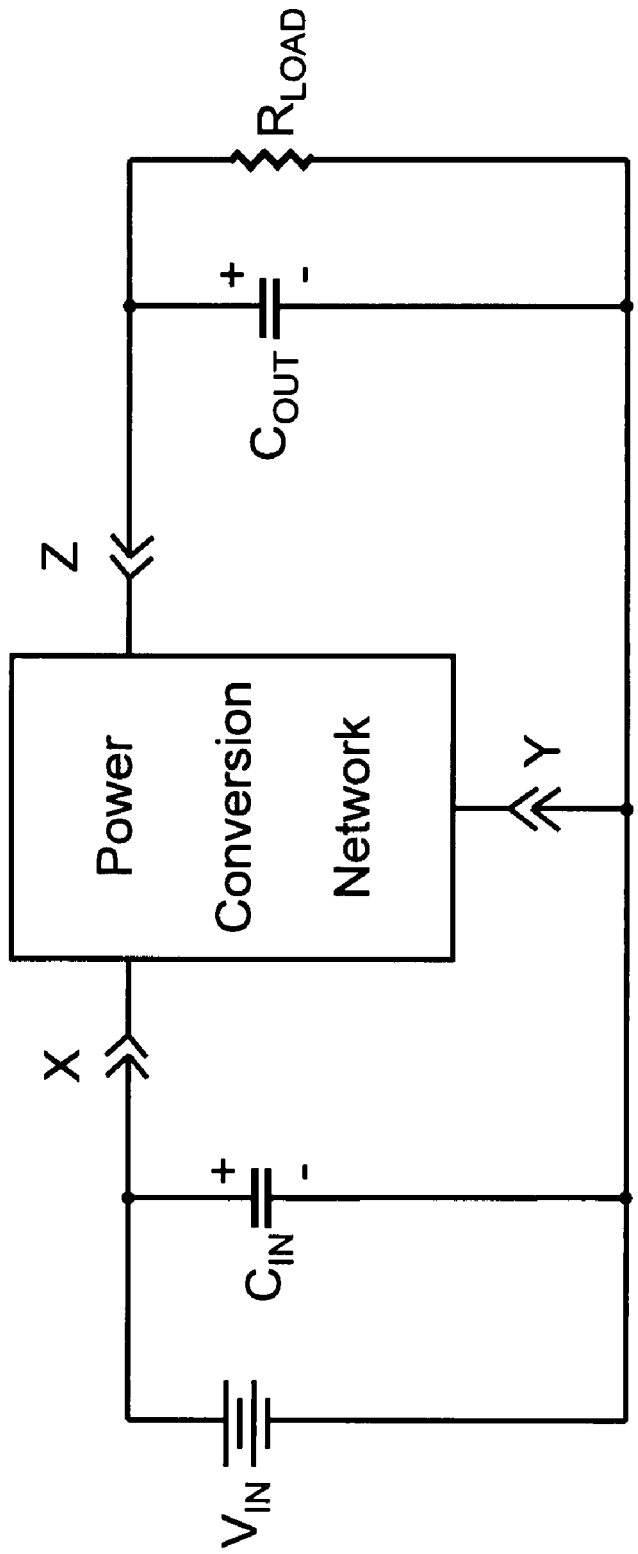
FIG. 8 illustrates the power conversion network of FIG. 7 configured to form a buck converter for large step down ratios according to the subject invention.
Figure 9:
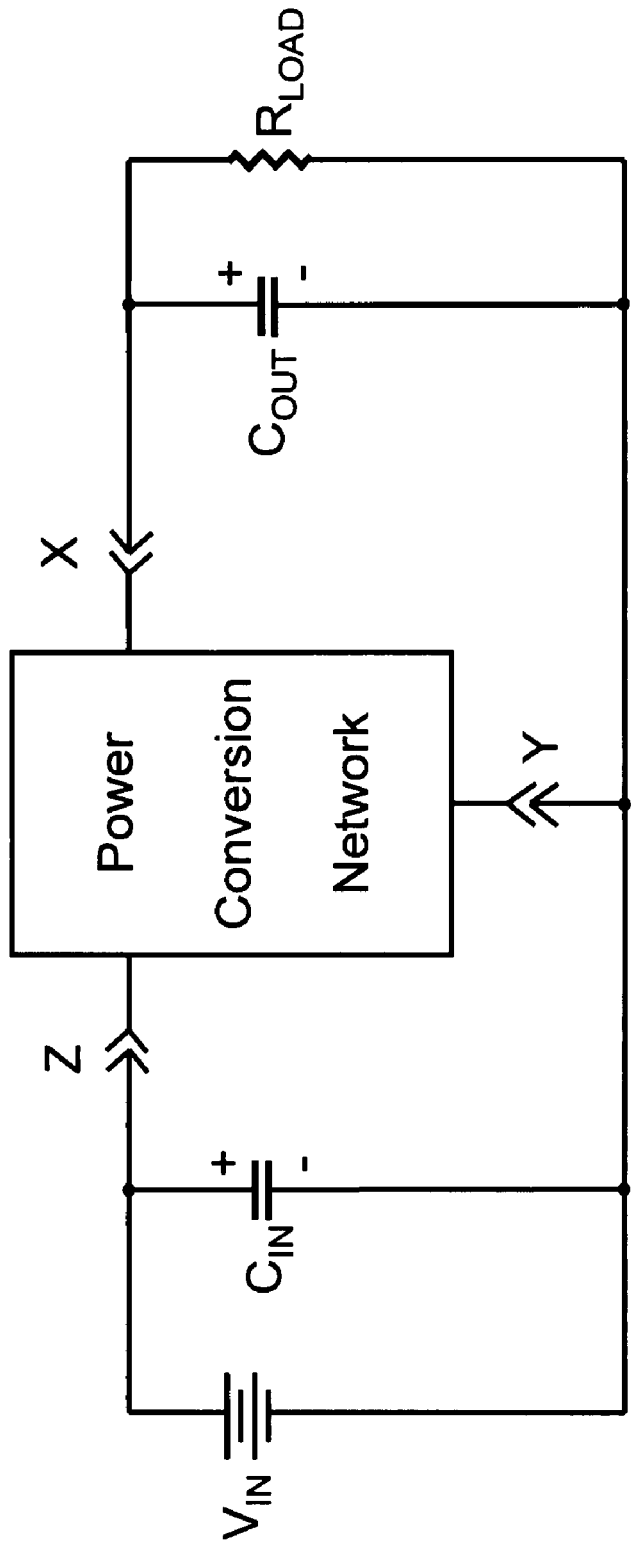
FIG. 9 illustrates the power conversion network of FIG. 7 configured to form a boost converter for large step up ratio applications according to the subject invention.
Figure 10:
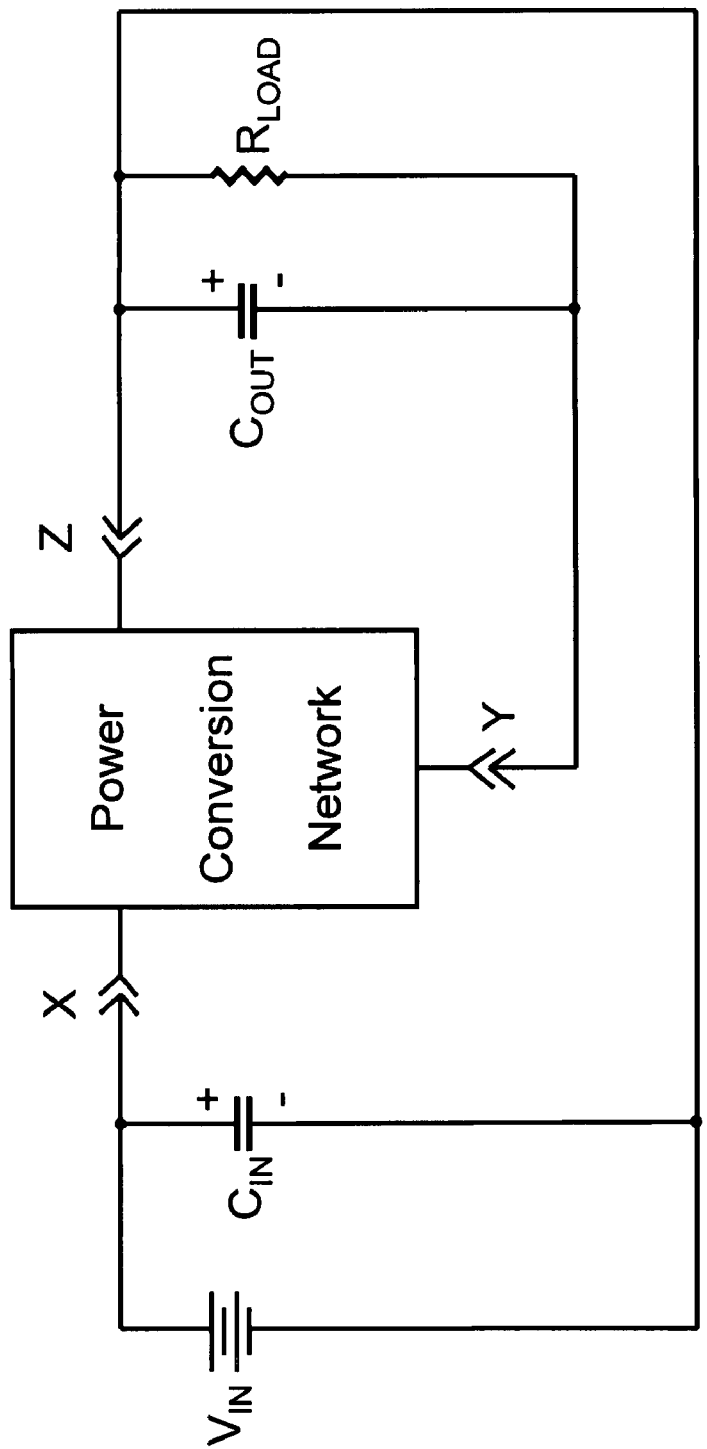
FIG. 10 illustrates the power conversion network of FIG. 7 configured to form a buck boost converter for large step down ratio inverting applications according to the subject invention.
Figure 11:
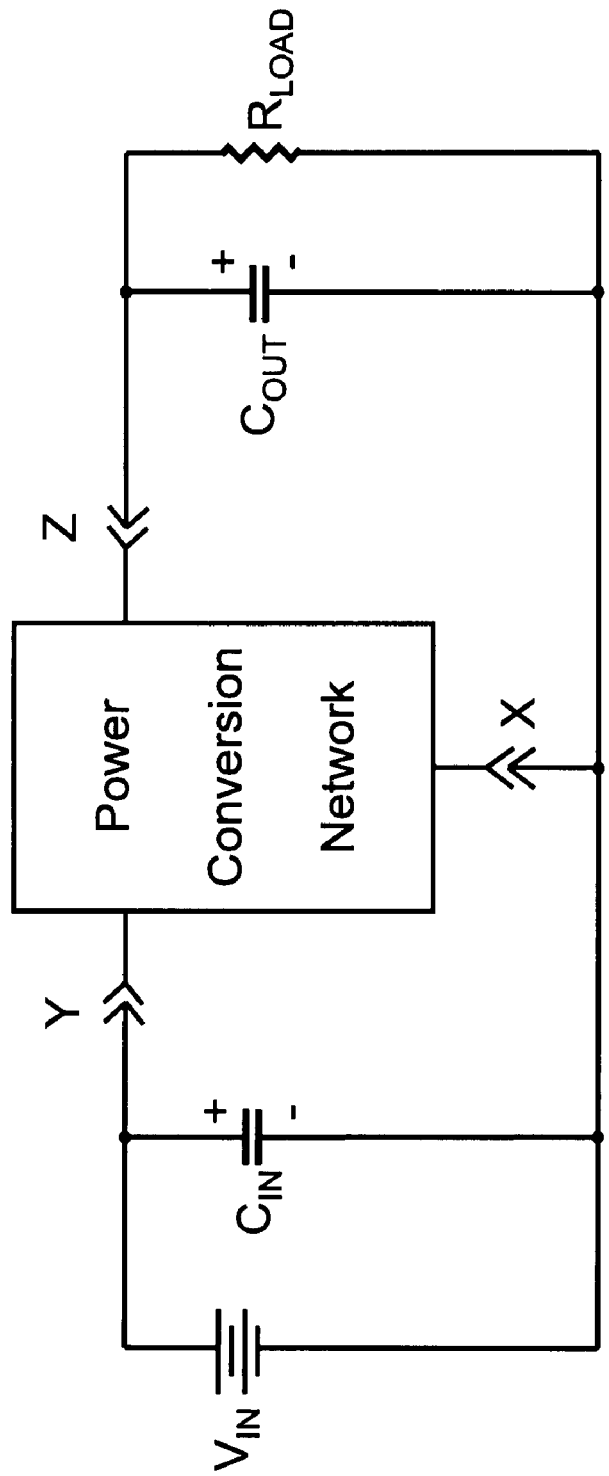
FIG. 11 illustrates the power conversion network of FIG. 7 configured to form a buck converter for small step down ratio applications according to the subject invention.
Figure 12:
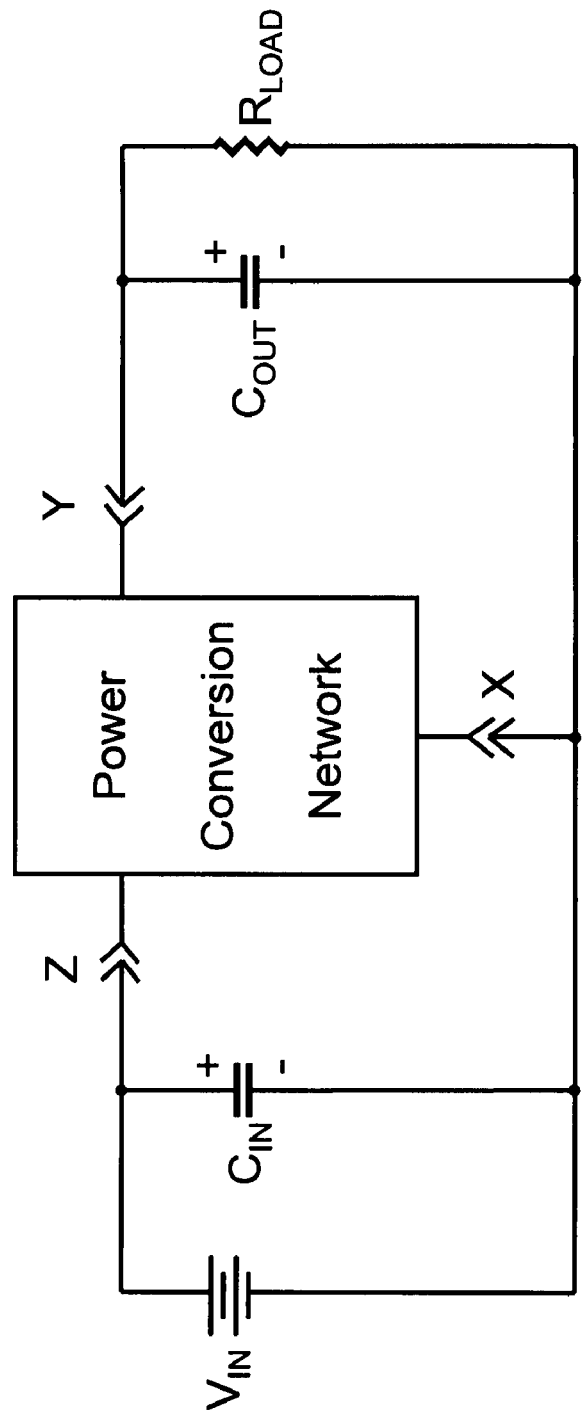
FIG. 12 illustrates the power conversion network of FIG. 7 configured to form a boost converter for small step up ratio applications according to the subject invention.
Figure 13:
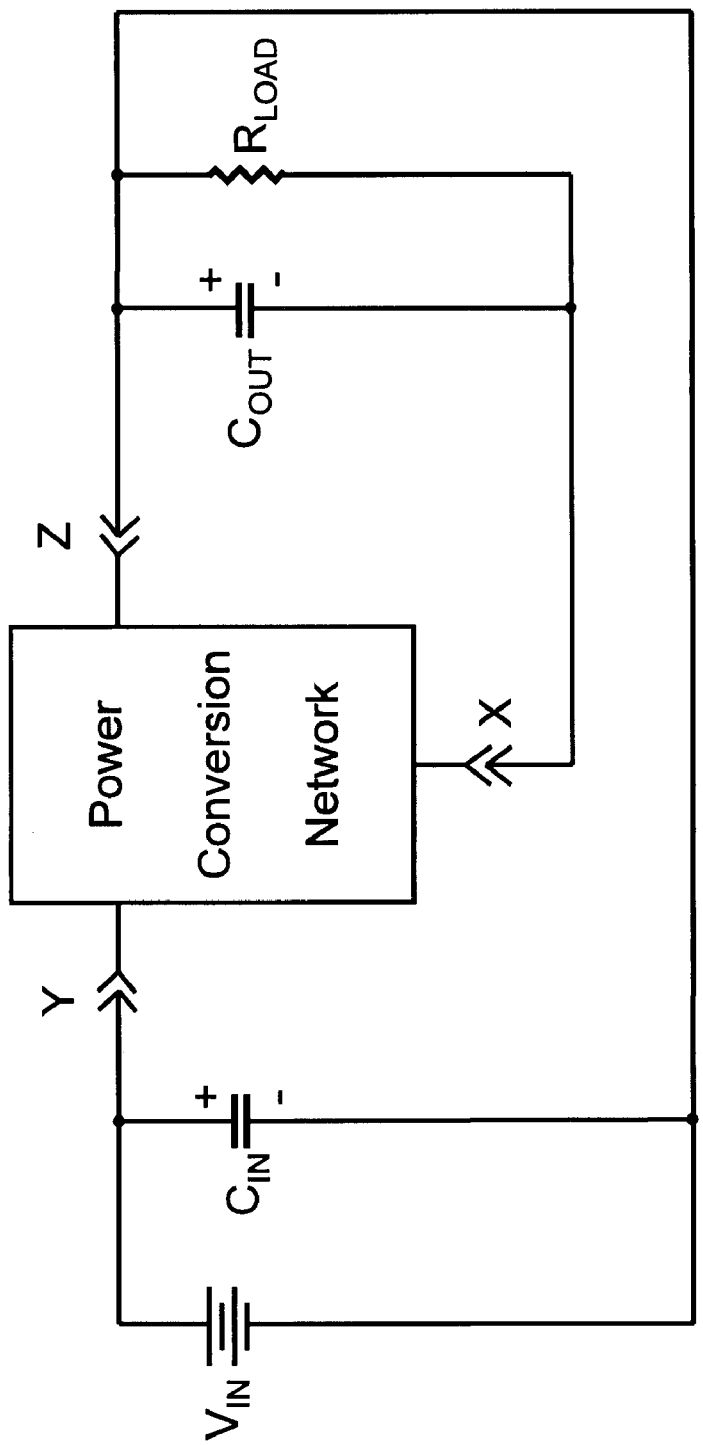
FIG. 13 illustrates the power conversion network of FIG. 7 configured to form a buck boost converter for large step up ratio inverting applications according to the subject invention.

Incorporated within the FIG. 2 circuit is a three terminal power conversion network, as illustrated in FIG. 7, wherein the three terminals are X, Y, and Z. The three terminal power conversion network of FIG. 7 can be viewed as a canonical cell and should be considered as an embodiment of the subject invention. FIGS. 2, 8, and 11 serve as illustrations of how the canonical cell of FIG. 7 can be configured to form non-inverting step down converters. FIGS. 9 and 12 are illustrations of how the power conversion network of FIG. 7 can be configured to form non-inverting step up converters. FIGS. 10 and 13 are illustrations of how the power conversion network of FIG. 7 can be configured to form inverting step down and step up converters.

CONCLUSION, RAMIFICATIONS, AND SCOPE OF INVENTION

Thus the reader will see that a simple power conversion network comprising two inductors, one capacitor, and three switches can achieve zero voltage switching over a broad range of line and load and inherent self protection without current sensing circuitry. In addition, only one of the three switches has voltage stress equal to the maximum line voltage when the network is applied in its buck forms and the other two switches have voltage stresses that are less than the maximum line voltage. The new power conversion network can be configured to form step up, step down, and inverting non-isolated power converters.

While my above description contains many specificities, these should not be construed as limitations on the scope of the invention, but rather, as exemplifications or preferred embodiments thereof. Many other variations are possible. For example, circuits similar to the circuits shown but with polarity of the input or output reversed or the polarity of switches reversed from that illustrated in the figures shall be considered embodiments of the subject invention. In many of the circuits shown there are series connected networks. The order of placement of circuit elements in series connected networks is inconsequential in the illustrations shown so that series networks in the illustrated circuits with circuit elements reversed or placed in an entirely different order within series connected networks are equivalent to the circuits illustrated and shall be considered embodiments of the subject invention. Also, most of the embodiments illustrated show simple switches, but the operation revealed and the benefits achieved in the subject invention can also be realized in circuits that implement the switches using N channel mosfets, P channel mosfets, IGBTs, JFETs, bipolar transistors, junction rectifiers, or schottky rectifiers, which should be considered embodiments of the subject invention. Also, parallel combinations of power conversion networks can be formed operating with multiple timing phases which share input, output, and $C_1$ capacitors which have the benefits of higher power processing capability, lower ripple, higher bandwidth, higher efficiency, and much reduced capacitor component stress, and these should be considered embodiments of the subject invention. Also, the new power conversion network contains two independent inductors which can be integrated on a single common core. Power conversion networks as revealed in this application, but with inductors combined on a single common core should be considered embodiments of this invention.

Accordingly, the scope of the invention should be determined not by the embodiments illustrated, but by the appended claims and their legal equivalents.

I claim:

1. A power conversion network having a first terminal, a second terminal, and a third terminal, comprising,
   a first circuit branch having a first terminal and a second terminal with said first terminal of said first circuit branch connected to said first terminal of said power conversion network, comprising,
   first switch means, having a first terminal and a second terminal, and
   a second circuit branch having a first terminal and a second terminal with said first terminal of said first switch means connected to said first terminal of said second circuit branch, connected in series with said first switch means comprising,
   second switch means having a first terminal and a second terminal with said first terminal of said second switch means connected to said first terminal of said second circuit branch operable substantially in anti-synchronization to said first switch means, and
   a series network having a first terminal and a second terminal with said first terminal of said series network connected to said first terminal of said second circuit branch connected in parallel to said second switch means comprising,
   a first capacitor having a first terminal and a second terminal, and
   a first inductor having a first terminal and a second terminal with said first terminal of said first capacitor connected to said first terminal of said first inductor,
   third switch means having a first terminal and a second terminal with said first terminal of said third switch means connected to said second terminal of said power conversion network and with said second terminal of said third switch means connected to said second terminal of said first circuit branch, operable substantially in anti-synchronization to said first switch means,
   a second inductor having a first terminal and a second terminal with said first terminal of said second inductor connected to said third terminal of said power conversion network and said second terminal of said second inductor connected to said second terminal of said first circuit branch, wherein the coupling coefficient for mutual magnetic coupling of said first inductor to said second inductor is substantially zero,
   whereby said terminals of said power conversion network are connected to an input source of dc voltage and power, an output load, and a return common to both said input source of dc voltage and power and said output load to form a complete power conversion circuit.

2. The power conversion network as set forth in claim 1 wherein said switch means comprise semiconductor switch means.

3. The power conversion network as set forth in claim 1 wherein said second terminal of said first switch means is connected to said second terminal of said first circuit branch and said second terminal of said second circuit branch is connected to said first terminal of said power conversion network and to said second terminal of said second switch means.

4. The power conversion network as set forth in claim 3 wherein said second terminal of said first capacitor is connected to said first terminal of said power conversion network and said second terminal of said first inductor is connected to said first terminal of said second switch means.

5. The power conversion network as set forth in claim 3 wherein said second terminal of said first capacitor is connected to said first terminal of said second switch means and said second terminal of said first inductor is connected to said first terminal of said power conversion network.

6. The power conversion network as set forth in claim 1 wherein said second terminal of said first switch means is connected to said first terminal of said power conversion network and said second terminal of said second circuit branch is connected to said second terminal of said first circuit branch and to said second terminal of said second switch means.

7. The power conversion network as set forth in claim 3 wherein said second terminal of said second capacitor is connected to said second terminal of said first circuit branch and said second terminal of said first inductor is connected to said first terminal of said second switch means.

8. The power conversion network as set forth in claim 3 wherein said second terminal of said first capacitor is connected to said first terminal of said second switch means and said second terminal of said first inductor is connected to said second terminal of said first circuit branch.

9. The power conversion network as set forth in claim 1 wherein said first inductor and said second inductor are integrated on a single common core.

* * * * *